United States Patent
Chen et al.

(10) Patent No.: US 10,698,699 B2
(45) Date of Patent: Jun. 30, 2020

(54) METHOD AND APPARATUS FOR CONFIGURING ACCELERATOR

(71) Applicant: Huawei Technologies Co., Ltd., Shenzhen (CN)

(72) Inventors: Zhiping Chen, Shenzhen (CN); Chaofei Tang, Shenzhen (CN); Zhiming Yao, Shenzhen (CN)

(73) Assignee: HUAWEI TECHNOLOGIES., LTD., Shenzhen (CN)

( * ) Notice: Subject to any disclaimer, the term of this patent is extended or adjusted under 35 U.S.C. 154(b) by 116 days.

(21) Appl. No.: 16/025,569

(22) Filed: Jul. 2, 2018

(65) Prior Publication Data

US 2018/0307499 A1    Oct. 25, 2018

Related U.S. Application Data

(63) Continuation of application No. PCT/CN2016/112143, filed on Dec. 26, 2016.

(30) Foreign Application Priority Data

Dec. 31, 2015  (CN) .......................... 2015 1 1032133
Apr. 13, 2016  (CN) .......................... 2016 1 0227605

(51) Int. Cl.
  *G06F 9/44*    (2018.01)
  *G06F 9/445*   (2018.01)
  (Continued)

(52) U.S. Cl.
  CPC ............ *G06F 9/445* (2013.01); *G06F 9/5044* (2013.01); *G06F 15/76* (2013.01); *G06F 15/7871* (2013.01); *G06F 9/4401* (2013.01)

(58) Field of Classification Search
  CPC ........ G06F 9/445; G06F 9/5044; G06F 15/76; G06F 15/7871
  (Continued)

(56) References Cited

U.S. PATENT DOCUMENTS 6,209,077 B1    3/2001  Robertson et al.
6,256,724 B1    7/2001  Hocevar et al.
(Continued)

FOREIGN PATENT DOCUMENTS

CN    104375972 A    2/2015
CN    104657308 A    5/2015
(Continued)

OTHER PUBLICATIONS

Machine Translation and Abstract of Chinese Publication No. CN104657308, May 27, 2015, 7 pages.
(Continued)

*Primary Examiner* — Volvick Derose
(74) *Attorney, Agent, or Firm* — Conley Rose, P.C.

(57) ABSTRACT

A method for configuring an accelerator, applied to a server including at least one bare accelerator. The at least one bare accelerator is an accelerator that is generated after a basic logic function is loaded for accelerator hardware, and the basic logic function includes a communications interface function and a loading function. The method includes determining, by the server, a target service type and a target bare accelerator, determining, by the server, a service logic function corresponding to the target service type, and loading, by the server, the service logic function corresponding to the target service type for the target bare accelerator to generate a target service accelerator, where the target service accelerator is capable of providing an acceleration service for a service of the target service type.

18 Claims, 4 Drawing Sheets

(51) Int. Cl.
*G06F 15/76* (2006.01)
*G06F 15/78* (2006.01)
*G06F 9/50* (2006.01)
*G06F 9/4401* (2018.01)

(58) Field of Classification Search
USPC .......................................................... 713/1
See application file for complete search history.

(56) References Cited

U.S. PATENT DOCUMENTS

| | | | |
|---|---|---|---|
| 2007/0245021 A1* | 10/2007 | Ohtsuka | G06F 16/9577 709/225 |
| 2010/0077179 A1* | 3/2010 | Stillwell, Jr. | G06F 9/3877 712/30 |
| 2011/0161972 A1* | 6/2011 | Dillenberger | G06F 9/5044 718/104 |
| 2014/0189862 A1* | 7/2014 | Kruglick | G06F 21/55 726/22 |
| 2014/0281472 A1* | 9/2014 | Yalamanchili | G06F 15/7871 713/100 |
| 2014/0380025 A1* | 12/2014 | Kruglick | G06F 9/30007 712/220 |
| 2015/0052332 A1* | 2/2015 | Mortensen | G06F 15/7889 712/37 |
| 2017/0039089 A1 | 2/2017 | Xia et al. | |

FOREIGN PATENT DOCUMENTS

| | | |
|---|---|---|
| CN | 104951353 A | 9/2015 |
| CN | 105824706 A | 8/2016 |
| WO | 2014116206 A1 | 7/2014 |

OTHER PUBLICATIONS

Machine Translation and Abstract of Chinese Publication No. CN105824706, Aug. 3, 2016, 25 pages.
Foreign Communication From a Counterpart Application, PCT Application No. PCT/CN2016/112143, English Translation of International Search Report dated Mar. 7, 2017, 2 pages.
Foreign Communication From a Counterpart Application, PCT Application No. PCT/CN2016/112143, English Translation of Written Opinion dated Mar. 7, 2017, 6 pages.
Foreign Communication From a Counterpart Application, European Application No. 16881150.3, Extended European Search Report dated Dec. 7, 2018, 8 pages.
Foreign Communication From a Counterpart Application, Chinese Application No. 201610227605.3, Chinese Search Report dated Jun. 26, 2018, 2 pages.
Foreign Communication From a Counterpart Application, Chinese Application No. 201610227605.3, Chinese Office Action dated Jul. 4, 2018, 5 pages.

* cited by examiner

METHOD AND APPARATUS FOR CONFIGURING ACCELERATOR

CROSS-REFERENCE TO RELATED APPLICATIONS

This application is a continuation of International Patent Application No. PCT/CN2016/112143 filed on Dec. 26, 2016, which claims priority to Chinese Patent Application No. 201610227605.3 filed on Apr. 13, 2016, which claims priority to Chinese Patent Application No. 201511032133.8 filed on Dec. 31, 2015, all of which are incorporated herein by reference in their entireties.

TECHNICAL FIELD

The present disclosure relates to the field of computer technologies, and in particular, to a method and an apparatus for configuring an accelerator.

BACKGROUND

Accelerators are key devices for performance improvement in information technology (IT), communication technology (CT), and information and communications technology (ICT), and can accelerate services. Commonly used accelerator hardware includes a field programmable gate array (FPGA), graphics processing unit (GPU), digital signal processor (DSP), an application-specific integrated circuit (ASIC), and the like. Only after accelerator hardware is loaded with a service logic function corresponding to a service type (for example, a video type) (which may be implemented by loading a binary file, also referred to as a bin file, corresponding to a service), the accelerator hardware can provide an acceleration service for a service of the service type.

Currently, an accelerator disposed in a server is usually an accelerator that is generated after a service logic function corresponding to a service has been loaded therein. Moreover, once an accelerator is disposed in a server, the accelerator can provide an acceleration service for only one type of service. As there are various service types, to provide an acceleration service for services of all service types using a method for configuring an accelerator in the other approaches, an accelerator corresponding to each service type needs to be configured in a server. However, the server does not need to provide an acceleration service for each service all the time, and some accelerators are in an idle state at a time point, leading to relatively low accelerator resource utilization.

SUMMARY

Embodiments of the present disclosure provide a method and an apparatus for configuring an accelerator, to increase accelerator resource utilization.

The following technical solutions are used in the embodiments of the present disclosure to achieve the foregoing objective.

According to a first aspect, a method for configuring an accelerator is provided. The method is applied to a server including at least one bare accelerator. The bare accelerator is an accelerator that is generated after a basic logic function is loaded for accelerator hardware, and the basic logic function includes a communications interface function and a loading function. The method includes determining, by the server, a target service type and a target bare accelerator, determining, by the server, a service logic function corresponding to the target service type, and loading, by the server, the service logic function corresponding to the target service type for the target bare accelerator, to generate a target service accelerator, where the target service accelerator is capable of providing an acceleration service for a service of the target service type.

According to the method for configuring an accelerator provided in this embodiment of the present disclosure, the target service type and the target bare accelerator are determined, and the service logic function corresponding to the target service type is loaded for the target bare accelerator, to generate a service accelerator. To be specific, in this embodiment of the present disclosure, only when an acceleration service needs to be provided for a service, a service accelerator is configured for the service, that is, configuration is performed as required. Compared with other approaches technical solution in which an accelerator for providing an acceleration service for each type of service is disposed in advance, the method can increase accelerator resource utilization.

According to a second aspect, an apparatus for configuring an accelerator is provided. The apparatus is applied to a server including at least one bare accelerator. The bare accelerator is an accelerator that is generated after a basic logic function is loaded for accelerator hardware, and the basic logic function includes a communications interface function and a loading function. The apparatus includes a determining unit configured to determine a target service type and a target bare accelerator, and determine a service logic function corresponding to the target service type, and a loading unit configured to load the service logic function corresponding to the target service type for the target bare accelerator, to generate a target service accelerator, where the target service accelerator is capable of providing an acceleration service for a service of the target service type.

Because the apparatus for configuring an accelerator in this embodiment of the present disclosure may be configured to perform the method for configuring an accelerator according to the first aspect, for a technical effect that can be achieved by the apparatus, refer to the technical effect of the first aspect, and details are not described herein again.

Based on the first aspect, in an optional implementation, determining, by the server, a target service type and a target bare accelerator may include receiving, by the server, a target service type sent by user equipment, and if the server does not include an accelerator for providing an acceleration service for a service of the target service type, selecting, by the server, a bare accelerator from the at least one bare accelerator as the target bare accelerator.

Correspondingly, based on the second aspect, in an optional implementation, the determining unit is further configured to receive a target service type sent by user equipment, and if the server does not include an accelerator for providing an acceleration service for a service of the target service type, select a bare accelerator from the at least one bare accelerator as the target bare accelerator.

In this optional implementation, the server selects the target bare accelerator by itself. During specific implementation, the server may determine the target bare accelerator based on a particular rule. The rule is not limited in the embodiments of the present disclosure.

Based on the first aspect, in another optional implementation, determining, by the server, a target service type and a target bare accelerator may include receiving, by the server, a target service type and an identifier of a target bare accelerator that are sent by user equipment.

Correspondingly, based on the second aspect, in an optional implementation, the determining unit is further configured to receive a target service type and an identifier of a target bare accelerator that are sent by user equipment.

In this optional implementation, a user specifies the target bare accelerator. In this way, user experience can be improved through user participation.

Based on any one of the first aspect or the optional implementations of the first aspect, optionally, after loading, by the server, the to-be-loaded service logic function for the target bare accelerator, to generate a target service accelerator, the method may further include unloading, by the server, the service logic function that corresponds to the target service type and that is loaded in the target service accelerator to generate a bare accelerator.

Based on any one of the second aspect or the optional implementations of the second aspect, optionally, the apparatus may further include an unloading unit configured to unload the service logic function that corresponds to the target service type and that is loaded in the target service accelerator to generate a bare accelerator.

In this optional implementation, the service logic function loaded in the service accelerator is unloaded such that a bare accelerator is generated from the service accelerator. Further, the server may further load service logic functions corresponding to other service types for the bare accelerator using the method according to the first aspect such that one bare accelerator may provide an acceleration service for different types of services at different time points. To be specific, one physical device may be configured as an acceleration engine that supports different services to meet a demand of accelerating the different types of services, thereby providing high flexibility. In addition, an acceleration service can be provided for a large quantity of types of services using a small amount of accelerator hardware, thereby saving hardware resources. Moreover, in a case of a determined amount of accelerator hardware, each piece of accelerator hardware can be fully used, thereby greatly increasing resource utilization.

Based on any one of the first aspect or the optional implementations of the first aspect, optionally, the method may further include updating, by the server, at least one of a set constituted by identifiers of bare accelerators and a set constituted by identifiers of service accelerators.

Correspondingly, the apparatus may further include an update unit configured to update at least one of a set constituted by identifiers of bare accelerators and a set constituted by identifiers of service accelerators.

The server (or the update unit) may update, periodically or in a triggered manner, at least one of the set constituted by identifiers of bare accelerators and the set constituted by identifiers of service accelerators. For example, at least one of the set constituted by identifiers of bare accelerators and the set constituted by identifiers of service accelerators is updated at preset intervals of time, or when elements in at least one of the set constituted by identifiers of bare accelerators and the set constituted by identifiers of service accelerators change, updating is performed.

Based on any one of the first aspect or the optional implementations of the first aspect, optionally, the method may further include sending, by the server, at least one of the set constituted by identifiers of bare accelerators and the set constituted by identifiers of service accelerators to the user equipment.

Based on any one of the second aspect or the optional implementations of the second aspect, optionally, the apparatus may further include a sending unit configured to send at least one of the set constituted by identifiers of bare accelerators and the set constituted by identifiers of service accelerators to the user equipment.

In this optional implementation, after receiving the set constituted by identifiers of bare accelerators and the set constituted by identifiers of service accelerators, the user equipment may display the set constituted by identifiers of bare accelerators and the set constituted by identifiers of service accelerators such that the user may specify the target bare accelerator or the target service accelerator based on content displayed on the user equipment.

Based on any one of the first aspect or the optional implementations of the first aspect, optionally, the method may further include displaying, by the server, at least one of the set constituted by identifiers of bare accelerators and the set constituted by identifiers of service accelerators.

Based on any one of the second aspect or the optional implementations of the second aspect, optionally, the apparatus may further include a display unit configured to display at least one of the set constituted by identifiers of bare accelerators and the set constituted by identifiers of service accelerators.

In this optional implementation, the server may display the set constituted by identifiers of bare accelerators and the set constituted by identifiers of service accelerators such that an administrator may specify the target bare accelerator or the target service accelerator based on content displayed on the server.

According to a third aspect, an apparatus for configuring an accelerator is provided. The apparatus is applied to a server including at least one bare accelerator. The bare accelerator is an accelerator that is generated after a basic logic function is loaded for accelerator hardware, and the basic logic function includes a communications interface function and a loading function. The apparatus includes a processor, a memory, and a system bus. The memory is configured to store a computer executable instruction. The processor and the memory are connected using the system bus. When the apparatus operates, the processor executes the computer executable instruction stored in the memory to cause the apparatus to perform the method for configuring an accelerator according to any one of the first aspect or the optional implementations of the first aspect.

According to a fourth aspect, a server is provided. The server includes the apparatus for configuring an accelerator according to either of the second aspect or the third aspect.

According to a fifth aspect, a readable medium is provided. The readable medium includes a computer executable instruction, and when a processor of a server executes the computer executable instruction, the server performs the foregoing method for configuring an accelerator.

Because the apparatus for configuring an accelerator, the server, and the readable medium in the embodiments of the present disclosure are all configured to perform the method for configuring an accelerator according to the first aspect, for technical effects that can be achieved by the apparatus, the server, and the readable medium, refer to the technical effect of the first aspect, and details are not described herein again.

DESCRIPTION OF EMBODIMENTS

First, some technical terms used in this application are explained and described, to facilitate understanding of embodiments of the present disclosure by persons skilled in the art.

(1) Accelerator hardware, bare accelerator, and service accelerator: Commonly used accelerator hardware includes an FPGA, a GPU, a DSP, an ASIC, and the like. The accelerator hardware may be classified into programmable accelerator hardware and non-programmable accelerator hardware. Preferably, the accelerator hardware used in the embodiments of the present disclosure may be programmable accelerator hardware.

Accelerator hardware can provide an acceleration service for a service only after being loaded with a basic logic function and a service logic function. The basic logic function includes a communications interface function, a loading function, and the like. The service logic function is a function that can enable the accelerator hardware to provide an acceleration service for a service.

In the other approaches, an accelerator disposed in advance in a server is accelerator hardware already loaded with a basic logic function and a service logic function. Therefore, in the other approaches, accelerator hardware only needs to be distinguished from the accelerator hardware loaded with the basic logic function and the service logic function. The accelerator hardware loaded with the basic logic function and the service logic function is referred to as an "accelerator".

In this embodiment of the present disclosure, an accelerator disposed in advance in a server may be accelerator hardware or accelerator hardware loaded with a basic logic function. Therefore, in the embodiments of the present disclosure, accelerator hardware, accelerator hardware loaded with a basic logic function, or accelerator hardware loaded with a service logic function need to be distinguished from each other. Further, the accelerator hardware loaded with the basic logic function is referred to as a "bare accelerator", and the accelerator hardware loaded with the service logic function is referred to as a "service accelerator".

(2) Server: The server in this application may be an ordinary server, or may be a cloud server, that is, a server in a cloud scenario. A cloud server may include all service devices in a cloud scenario. Each service device included in the cloud server may be provided with a central processing unit (CPU). To be specific, each service device included in the cloud server may serve as an independent entity. One or more service devices in the cloud server may serve as a control end of the cloud server to control the other service devices. Physical locations of any two service devices included in the cloud server may be relatively remote to each other. For example, one service device is located in a city A, and the other service device is located in a city B.

Figure 1:
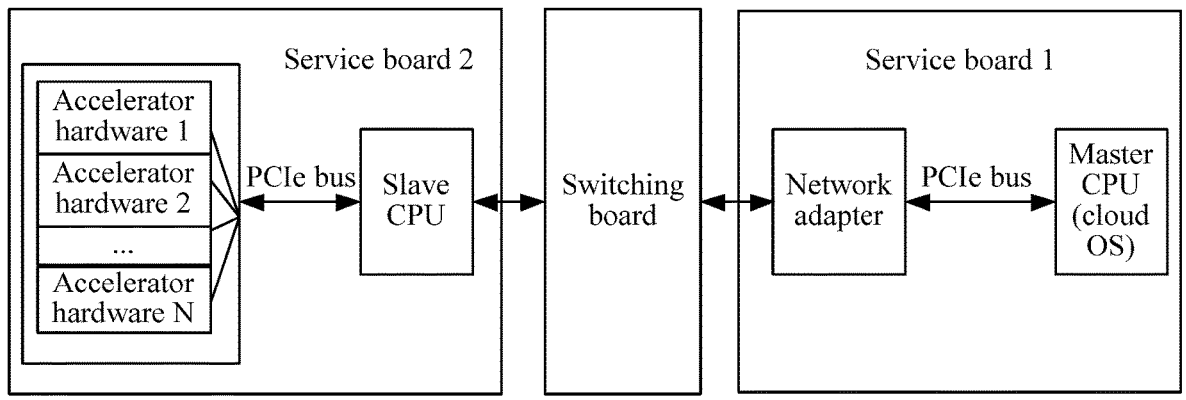
FIG. 1 is a schematic diagram 1 of a hardware architecture of a server to which a technical solution provided in an embodiment of the present disclosure is applicable.

As shown in FIG. 1, FIG. 1 is a schematic diagram of a hardware architecture of a server to which a technical solution provided in an embodiment of the present disclosure is applicable. The server shown in FIG. 1 includes a service board 1, a service board 2, and a switching board. Each service board may correspond to one of the service devices. Alternatively, a plurality of service boards may correspond to one of the service devices. To be specific, a plurality of service boards are integrated into one service device.

The service board 1 includes a CPU (hereinafter referred to as a master CPU), a network adapter, and the like. A cloud operating system (OS) is installed on the service board 1. For example, the master CPU and the network adapter are connected using a dedicated peripheral component interconnect express (PCIe) bus.

The service board 2 includes a CPU (hereinafter referred to as a slave CPU) and accelerator hardware 1 to accelerator hardware N. N is an integer greater than or equal to 2. For example, the slave CPU and the accelerator hardware 1-N are connected using a PCIe bus.

The switching board is configured to connect to the service board 1 and the service board 2. For example, a network adapter in the service board 1 and the switching board are connected using a bus (for example, a 10 GE Base-KR bus), and the slave CPU in the service board 2 and the switching board are connected using a bus (for example, a 10 GE Base-KR bus).

The service board 1 serves as a control end, and the master CPU in the service board 1 may control the accelerator hardware 1-N in the service board 2 using the cloud OS. The service board 1 may be referred to as a master service board, that is, a control board. The service board 2 may be referred to as a slave service board. One master service board may be connected to a plurality of slave service boards using one or more switching boards. One or more pieces of accelerator hardware may be disposed on one slave service board. Different service boards may be distributed in a same physical area or different physical areas.

Each slave CPU can manage a plurality of pieces of accelerator hardware, a plurality of bare accelerators, and a plurality of service accelerators on the slave service board on which the slave CPU is located. For example, each slave CPU may load a service logic function for the plurality of pieces of accelerator hardware on the service board on which the slave CPU is located. For another example, each slave CPU may further allocate an identifier to a newly-generated bare accelerator or a newly-generated service accelerator, or delete an identifier of a bare accelerator for which a service accelerator has already been generated, or delete an identifier of a service accelerator for which a bare accelerator has already been generated. For still another example, each slave CPU may further report, to the master CPU, identifiers of the bare accelerator and identifiers of the service accelerator on the board on which the slave CPU is located.

The master CPU may control each slave CPU to manage the plurality of pieces of accelerator hardware, the plurality of bare accelerators, and the plurality of service accelerators on the service board on which the slave CPU is located. For example, the master CPU determines at which moment and for which accelerator hardware each slave CPU is to load a service logic function. In addition, the master CPU may further collect statistics on and update the identifiers of the bare accelerators and the identifiers of the service accelerators that are reported by each slave CPU, and so on.

From the perspective of logic functions, the master service board (for example, the service board 1 in FIG. 1) may be referred to as a cloud end, and the slave service board (for example, the service board 2 in FIG. 1) may be referred to as an acceleration service provider. During specific implementation, the cloud end may further be connected to one or more user equipments, not shown in FIG. 1.

For a user, based on the hardware architecture shown in FIG. 1, the following functions can be implemented. The user accesses a "cloud (that is, cloud end)" using a client installed on user equipment, similar to login to the website of Baidu Cloud and the like. The cloud end controls the acceleration service provider to provide an acceleration service for the service accessed by the user equipment.

Figure 2:
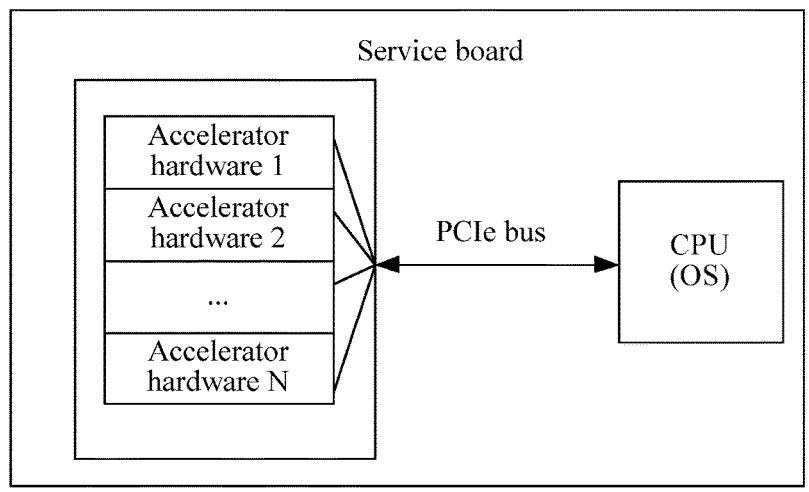
FIG. 2 is a schematic diagram 2 of a hardware architecture of a server to which a technical solution provided in an embodiment of the present disclosure is applicable.

It should be noted that the hardware shown in FIG. 1 is only an optional implementation. During specific implementation, the service board 1 and the service board 2 may be fabricated on one board, that is, integrated into one service board. It should be understood that, if the service board 1 and the service board 2 are integrated into one service board, the server board may not include any switching board, and may include only one CPU, that is, there is no need to distinguish the master CPU and the slave CPU. In addition, the cloud end and the acceleration service provider may not need to be distinguished, and the service board may further be connected to one or more user equipments. As shown in FIG. 2, FIG. 2 is a schematic diagram of a hardware architecture of a server to which a technical solution provided in an embodiment of the present disclosure is applicable. The server shown in FIG. 2 includes a service board, and the service board includes a CPU and accelerator hardware 1 to accelerator hardware N. N is an integer greater than or equal to 2. For example, the CPU and the accelerator hardware 1-N are connected using a PCIe bus.

The technical solutions provided in the embodiments of the present disclosure are described below by way of example using the hardware architecture of the cloud server shown in FIG. 1 as an example. Persons of ordinary skill in the art should be able to derive a specific example shown in FIG. 2 from the example shown in FIG. 1 without creative efforts.

(3) Plurality of, "/": "Plurality of" in this application means two or more. For example, a plurality of accelerators means two or more accelerators. The character "/" in this application represents an "or" relationship. For example, A/B means A or B.

The following describes the technical solutions in the embodiments of the present disclosure by way of example with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 3:
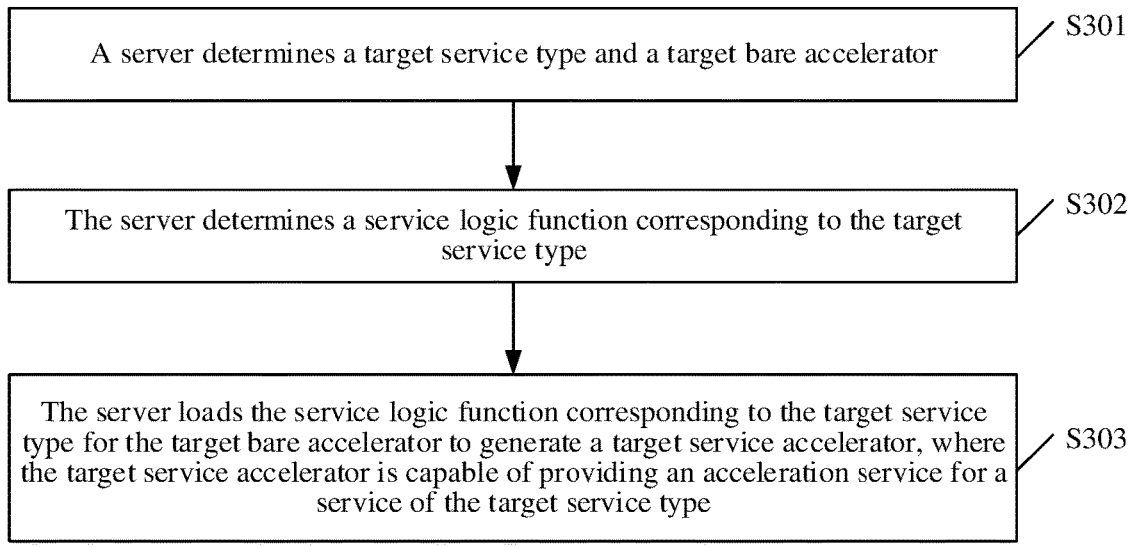
FIG. 3 is a schematic flowchart of a method for configuring an accelerator according to an embodiment of the present disclosure.

As shown in FIG. 3, an embodiment of the present disclosure provides a method for configuring an accelerator. The method is applied to a server including at least one bare accelerator. The bare accelerator is an accelerator that is generated after a basic logic function is loaded for accelerator hardware, and the basic logic function includes a communications interface function and a loading function, but does not include a "service logic function". To be specific, an accelerator loaded with the basic logic function does not have a service processing function. The method may include the following steps S301 to S303.

Step S301: The server determines a target service type and a target bare accelerator.

A "service type" may be a type of a media-related service (for example, a service type such as picture, audio, or video), or may be another service type that requires acceleration processing. The target service type may be any service type supported by the server.

One or more bare accelerators may be disposed in the server in advance. Alternatively, one or more pieces of accelerator hardware may be disposed in the server in advance, and then the server uses a CPU on a service board on which each piece of accelerator hardware is located to load a basic logic function for the accelerator hardware, to generate a bare accelerator. For example, based on FIG. 1, the accelerator hardware 1-N may be disposed on the service board 2 in advance, and then the slave CPU on the service board 2 separately loads a basic logic function for the accelerator hardware 1-N, to generate bare accelerators. The target bare accelerator may be a bare accelerator determined by the server, or may be a bare accelerator specified by a user.

A basic logic may be loaded to a particular location in accelerator hardware, to implement basic functions such as the communications interface (for example, a PCIe interface) function and the loading function. After loaded with the communications interface function, accelerator hardware can serve as a device complying with the communications interface protocol, and communicate with a CPU. When a communications interface is a PCIe communications interface, after a bare accelerator is powered on (that is, a bare accelerator chip is powered on), the bare accelerator functions as a PCIe device in a cloud OS and can communicate, using the PCIe communications interface, with a CPU of a service board on which the bare accelerator is located.

Optionally, the process in which the server uses the CPU on the service board on which each piece of accelerator hardware is located to load the basic logic function for the accelerator hardware may include the following steps. The CPU scans accelerator hardware on the service board to which the CPU belongs. For example, based on FIG. 1, the slave CPU on the service board 2 scans the accelerator hardware 1-N. Provided that one device/component complies with the PCIe specification, a CPU on a service board on which the device/component is located can find the device/component through scanning by running a program related to a basic input/output system (BIOS) in the CPU. Then, the slave CPU determines, using a bus device function (BDF) number corresponding to accelerator hardware found through scanning, a drive corresponding to the accelerator hardware. One PCIe device corresponds to one BDF number, and one BDF number corresponds to one drive. Next, the slave CPU executes the drive, to generate a bare accelerator using the accelerator hardware, and allocates an identifier to the bare accelerator. The identifier of the bare accelerator may reflect some attribute information. For example, BMx represents a bare accelerator x. Information such as a field occupied by the attribute information and a type of the attribute information are not limited in this embodiment of the present disclosure.

Basic logic functions loaded in bare accelerators on different slave service boards in the server may be the same or different. For example, a bare accelerator on a slave service board in the server and a slave CPU on the slave service board are connected using a PCIe bus. In this case, a communications interface in the basic logic function is a PCIe communications interface. An example in which the basic logic functions loaded in the bare accelerators are the same and communications interfaces are all PCIe communications interfaces is used for description throughout this specification.

Step S302: The server determines a service logic function corresponding to the target service type.

The server may prestore one or more service types supported by the server and a service logic function corresponding to each service type. Preferably, the server prestores the service logic function corresponding to each service type supported by the server. Moreover, the service logic function corresponding to the service type stored in the server may be updated. For example, when the server supports a new service, a service logic function corresponding to a service type of the new service may be loaded to the server.

Based on FIG. 1, the service logic function may be stored in a folder in a specified path of the slave service board.

Step S303: The server loads the service logic function corresponding to the target service type for the target bare accelerator to generate a target service accelerator, where the target service accelerator is capable of providing an acceleration service for a service of the target service type.

Based on FIG. 1, step S301 and step S302 may be performed by the master CPU in the server, and step S303 may be performed by the slave CPU in the server. Based on FIG. 2, steps S301 to S303 may be performed by the CPU in the server.

Based on FIG. 1, the slave CPU loads the service logic function corresponding to the target service type in the folder in the specified path to the target bare accelerator using the PCIe bus, to generate the target service accelerator. Further, the loading process may be completed using a drive of the target bare accelerator.

According to the method for configuring an accelerator that is provided in this embodiment of the present disclosure, the target service type and the target bare accelerator are determined, and the service logic function corresponding to the target service type is loaded for the target bare accelerator, to generate a service accelerator. To be specific, in this embodiment of the present disclosure, only when an acceleration service needs to be provided for a service, a service accelerator is configured for the service, that is, configuration is performed as required. Compared with a other approaches technical solution in which an accelerator for providing an acceleration service for each service is disposed in advance, the method can increase accelerator resource utilization.

Figure 4:
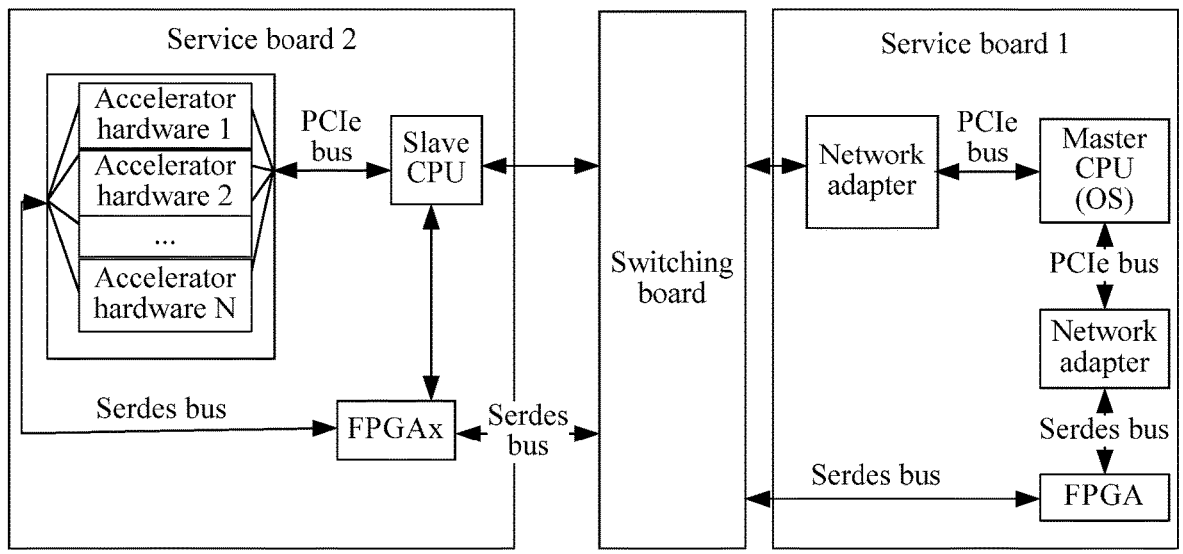
FIG. 4 is a schematic diagram 3 of a hardware architecture of a server to which a technical solution provided in an embodiment of the present disclosure is applicable.

FIG. 4 is drawn based on FIG. 1 and is a schematic diagram of a hardware architecture of a server to which an embodiment of the present disclosure is applicable. The service board 2 further includes an FPGAx (x represents 0, 1, 2, etc., and FPGAx represents that there may be a plurality of FPGA chips) configured to implement a network adapter function and a PCIe controller function, which are respectively responsible for data-plane and control-plane communication of a hardware acceleration device. For example, the slave CPU and the FPGAx are connected using a PCIe bus, the FPGAx and the accelerator hardware 1-N are connected using a serializer-deserializer (serdes) bus, and the FPGAx and the switching board are connected using a serdes bus.

The service board 1 further includes an FPGA. For example, the FPGA in the service board 1 and the switching board are connected using a serdes bus.

After step S303, the method may further include allocating, by the slave CPU, an identifier to the target service accelerator, and reporting the identifier of the target service accelerator to the master CPU. The process may be referred to as a process of registering the target service accelerator with the cloud OS. Then, the server may accelerate the service using a path "master CPU-network adapter-FPGA-serdes bus-switching board-serdes bus-FPGAx-accelerator hardware 1-N" in the hardware architecture shown in FIG. 4. In this way, the service is accelerated using a dedicated hardware path that does not pass through the slave CPU such that a transmission rate of service data can be increased.

In an optional implementation, step S301 may include receiving, by the server, a target service type sent by user equipment, and if the server does not include a service accelerator corresponding to the target service type, selecting, by the server, a bare accelerator from the at least one bare accelerator as the target bare accelerator.

The service accelerator corresponding to the target service type is a service accelerator that provides an acceleration service for service of the target service type.

In this optional implementation, the server selects the target bare accelerator by itself. Based on FIG. 1, the master CPU receives the target service type sent by the user equipment, determines whether a set constituted by identifiers of service accelerators includes a service accelerator corresponding to the target service type, and if not, selects an identifier of a bare accelerator from the set constituted by identifiers of bare accelerators as an identifier of the target bare accelerator. For example, the master CPU may arbitrarily select an identifier of a bare accelerator from the set constituted by identifiers of bare accelerators as the identifier of the target bare accelerator, or select, from the set constituted by identifiers of bare accelerators, one of identifiers of bare accelerators that are reported by a slave CPU that is distant from the user equipment by a distance less than or equal to a preset value, as the identifier of the target bare accelerator. Certainly, the present disclosure is not limited thereto.

In this optional implementation, the set constituted by identifiers of service accelerators may be a set consisting of identifiers of service accelerators reported by some or all of the slave CPUs, and the set constituted by identifiers of bare accelerators may be a set consisting of identifiers of bare accelerators reported by some or all of the slave CPUs.

In addition, if the set constituted by identifiers of service accelerators includes a service accelerator corresponding to the target service type, the server may directly provide an acceleration service for a service of the target service type using the service accelerator. For a specific manner of implementing the acceleration service, refer to the other approaches, and details are not described herein. In addition, when receiving an indication message of the user equipment, the server may unload a service logic function loaded in a service accelerator in a set constituted by service accelerators, for example, any service accelerator, or a service accelerator that is idle at a current time point, or a service accelerator on a service board that is relatively close to the user equipment, or a service accelerator carried in the indication message, to generate a bare accelerator, and then regenerate a target service accelerator using the bare accelerator.

In another optional implementation, step S301 may further include receiving, by the server, a target service type and an identifier of a target bare accelerator that are sent by user equipment.

In this optional implementation, a user specifies the target bare accelerator. The user equipment can provide a user interface (UI) for the user to indicate the target bare accelerator to the user equipment such that the user equipment indicates the identifier of the target bare accelerator to the server.

In another optional implementation, after step S303, the method may further include unloading, by the server, the service logic function that corresponds to the target service type and that is loaded in the target service accelerator, to generate a bare accelerator.

In this optional implementation, the service logic function loaded in the service accelerator is unloaded such that a bare accelerator is generated from the service accelerator. Further, the server may further load service logic functions corresponding to other service types for the bare accelerator using the method including the foregoing steps S301-S303 such that one bare accelerator may provide an acceleration service for different types of services at different time points. To be specific, one physical device may be configured as an acceleration engine that supports different services, to meet a demand of accelerating the different types of services, thereby providing high flexibility. In addition, an acceleration service can be provided for a large quantity of types of services using a small amount of accelerator hardware, thereby saving hardware resources. Moreover, in a case of a determined amount of accelerator hardware, each piece of accelerator hardware can be fully used, thereby greatly increasing resource utilization.

Example 1

The server receives an indication message of the user equipment. The indication message carries the identifier of the target service accelerator, and is used to instruct the server to unload the service logic function that corresponds to the target service type and that is loaded in the target service accelerator. The server unloads, according to the indication message, the service logic function that corresponds to the target service type and that is loaded in the target service accelerator, to generate a bare accelerator.

Based on FIG. 1, the master CPU receives an indication message sent by the user equipment, where the indication message carries the identifier of the target service accelerator, and then sends the indication message to the slave CPU on the slave service board of the target service accelerator. Next, the slave CPU unloads, according to the indication message, the service logic function that corresponds to the target service type and that is loaded in the target service accelerator, to generate a bare accelerator. In addition, the method may further include deleting, by the slave CPU, an identifier of the target service accelerator, and allocating an identifier to the bare accelerator.

Example 2

Based on an optional implementation of step 301, if the server determines that the set constituted by service accelerators does not include a service accelerator corresponding to the target service type and a set constituted by bare accelerators is empty, indicating that the server does not include any bare accelerator, the server unloads a service logic function loaded in a service accelerator in the set constituted by service accelerators, for example, any service accelerator, or a service accelerator that is idle at a current time point, or a service accelerator on a service board that is relatively close to the user equipment, or a service accelerator carried in the indication message, to generate a bare accelerator, and then, regenerates a service accelerator corresponding to the target service type using the bare accelerator.

Optionally, after step S303, the method may further include allocating, by the server, an identifier to the target service accelerator, and deleting the identifier of the target bare accelerator. In an optional implementation, the method may further include updating, by the server, at least one of the set constituted by identifiers of bare accelerators and the set constituted by identifiers of service accelerators.

The identifier of the target service accelerator may reflect some attribute information. For example, VCx represents a service accelerator corresponding to an audio and video service. Information such as a field occupied by the attribute information and a type of the attribute information are not limited in this embodiment of the present disclosure.

Based on FIG. 1, after the slave CPU on the slave service board on which the bare accelerator is located generates the target service accelerator, the slave CPU may allocate an identifier to the target service accelerator, and delete the identifier of the target bare accelerator. Then, the slave CPU sends a first indication message and a second indication message to the master CPU. The first indication message includes the identifier of the target service accelerator, and is used to instruct the master CPU to add the identifier of the target service accelerator into the set constituted by identifiers of service accelerators. The second indication message includes the identifier of the target bare accelerator, and is used to instruct the master CPU to delete the identifier of the target bare accelerator from the set constituted by identifiers of bare accelerators. During specific implementation, the first indication message and the second indication message may be combined into one indication message, to reduce signaling interaction. The master CPU enables hot swapping, to update the set constituted by bare accelerators and the set constituted by service accelerators. Hot swapping is a software function of the cloud OS, and is used to update the set constituted by bare accelerators and the set constituted by service accelerators. During specific implementation, the master CPU may enable hot swapping periodically or in a triggered manner.

At least one of the set constituted by identifiers of bare accelerators and the set constituted by identifiers of service accelerators may be stored in the server in any form such as a table, a list, or a combination thereof.

In an optional implementation, the method may further include sending, by the server, at least one of the set constituted by identifiers of bare accelerators and the set constituted by identifiers of service accelerators to the user equipment.

The user equipment may be any user equipment that requests the server for an acceleration service.

Based on FIG. 1, the master CPU sends at least one of the set constituted by identifiers of bare accelerators and the set constituted by identifiers of service accelerators to the user equipment. In this optional implementation, the user equipment can learn of the set constituted by identifiers of bare accelerators and the set constituted by identifiers of service accelerators in the server, and therefore can select a target bare accelerator or a target service accelerator by himself or herself.

In an optional implementation, the method may further include displaying, by the server, at least one of the set constituted by identifiers of bare accelerators and the set constituted by identifiers of service accelerators.

Based on FIG. 1, the master service board (or the server) on which the master CPU is located may display at least one of the set constituted by identifiers of bare accelerators and the set constituted by identifiers of service accelerators on a UI. The set constituted by identifiers of bare accelerators herein may be a set consisting of identifiers of bare accelerators on some or all of the service boards where the slave CPUs are located, and the set constituted by identifiers of service accelerators may be a set consisting of identifiers of service accelerators on some or all of the service boards where the slave CPUs are located. In addition, the slave service board (or the server) of the slave CPU may also display at least one of the set constituted by identifiers of bare accelerators and the set constituted by identifiers of service accelerators on the UI.

This optional implementation may be applied to the following scenario. An administrator enters a cloud OS command to the server, to view at least one of the set constituted by identifiers of bare accelerators and the set constituted by identifiers of service accelerators, the server displays at least one of the set constituted by identifiers of bare accelerators and the set constituted by identifiers of service accelerators according to the cloud OS command.

Figure 5:
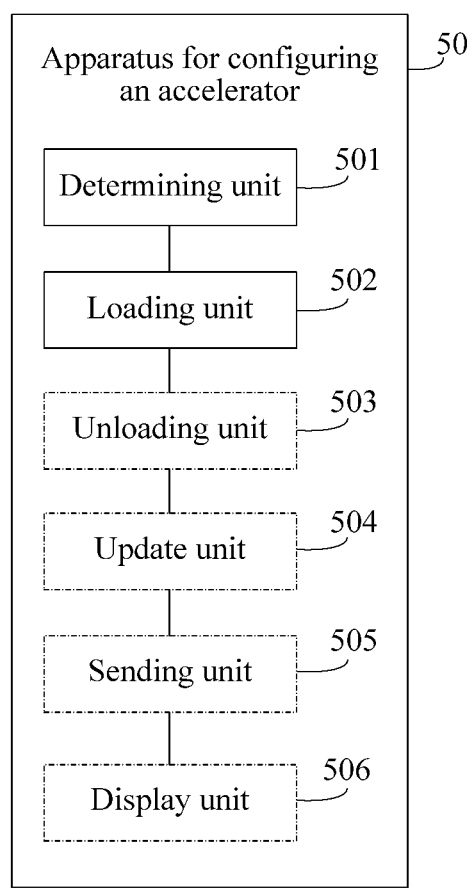
FIG. 5 is a schematic structural diagram 1 of an apparatus for configuring an accelerator according to an embodiment of the present disclosure.

As shown in FIG. 5, FIG. 5 is a schematic structural diagram of an apparatus 50 for configuring an accelerator according to an embodiment of the present disclosure. The apparatus 50 is applied to a server including at least one bare accelerator. The bare accelerator is an accelerator that is generated after a basic logic function is loaded for accelerator hardware, and the basic logic function includes a communications interface function and a loading function. The apparatus 50 is configured to perform the steps performed by the server in the foregoing method for configuring an accelerator. The apparatus 50 may include units and modules corresponding to corresponding steps. For example, the apparatus may include a determining unit 501 configured to determine a target service type and a target bare accelerator, and determine a service logic function corresponding to the target service type, and a loading unit 502 configured to load the service logic function corresponding to the target service type for the target bare accelerator to generate a target service accelerator, where the target service accelerator is capable of providing an acceleration service for a service of the target service type.

In an optional implementation, the determining unit 501 may be further configured to receive a target service type sent by user equipment, and if the server does not include an accelerator for providing an acceleration service for a service of the target service type, select a bare accelerator from the at least one bare accelerator as the target bare accelerator.

In another optional implementation, the determining unit 501 may be further configured to receive a target service type and an identifier of a target bare accelerator that are sent by user equipment.

Optionally, the apparatus 50 may further include an unloading unit 503 configured to unload the service logic function that corresponds to the target service type and that is loaded in the target service accelerator to generate a bare accelerator.

Optionally, the apparatus 50 may further include an update unit 504 configured to update at least one of a set constituted by identifiers of bare accelerators and a set constituted by identifiers of service accelerators.

Optionally, the apparatus 50 may further include a sending unit 505 configured to send at least one of the set constituted by identifiers of bare accelerators and the set constituted by identifiers of service accelerators to the user equipment.

Optionally, the apparatus 50 may further include a display unit 506 configured to display at least one of the set constituted by identifiers of bare accelerators and the set constituted by identifiers of service accelerators.

It may be understood that, the apparatus 50 in this embodiment of the present disclosure may correspond to the server in the method described in the foregoing embodiment, and division and/or functions of the modules in the apparatus 50 in this embodiment of the present disclosure are for implementing the foregoing method procedures. For brevity, details are not described herein again. In the apparatus 50, units such as the determining unit 501, the loading unit 502, the unloading unit 503, the update unit 504, and the sending unit 505 may be implemented based on a CPU and a memory. To be specific, the memory stores corresponding instructions for reading and execution by the CPU to implement the functions of the units. The display unit 506 may be various types of displays to facilitate viewing by a user.

Because the apparatus 50 in this embodiment of the present disclosure may be configured to perform the foregoing method procedures, for a technical effect that can be achieved by the apparatus 50, refer to the foregoing method embodiment, and details are not described herein again.

Figure 6:
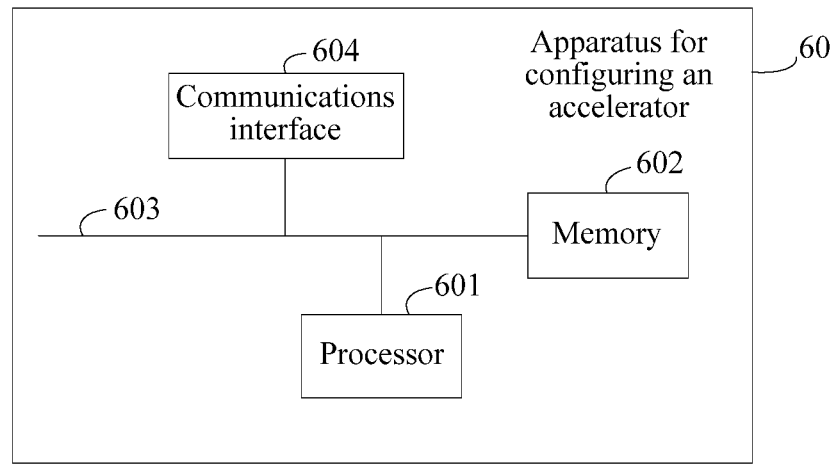
FIG. 6 is a schematic structural diagram 2 of an apparatus for configuring an accelerator according to an embodiment of the present disclosure.

As shown in FIG. 6, FIG. 6 is a schematic structural diagram of an apparatus 60 for configuring an accelerator according to an embodiment of the present disclosure. The apparatus 60 is applied to a server including at least one bare accelerator. The bare accelerator is an accelerator that is generated after a basic logic function is loaded for accelerator hardware, and the basic logic function includes a communications interface function and a loading function. The apparatus 60 is configured to perform the steps performed by the server in the foregoing method for configuring an accelerator. For example, the apparatus 60 may include a processor 601, a memory 602, a system bus 603, and a communications interface 604.

The memory 602 is configured to store a computer executable instruction. The processor 601 and the memory 602 are connected using the system bus. When the apparatus 60 operates, the processor 601 executes the computer executable instruction stored in the memory 602 to cause the apparatus 60 to perform any of the foregoing methods for configuring an accelerator. For a specific method for configuring an accelerator, refer to related descriptions in the embodiment described above, and details are not described herein again.

This embodiment further provides a storage medium, and the storage medium may include the memory 602.

The processor 601 may be CPU. The processor 601 may also be a general purpose processor, a DSP, an ASIC, an FPGA or another programmable logic device, a discrete gate, a transistor logic device, or a discrete hardware component. The general purpose processor may be a microprocessor or the processor 601 may be any conventional processor or the like.

The processor 601 may be a special purpose processor, and the special purpose processor may include at least one of a baseband processing chip, a radio frequency processing chip, and the like. Further, the special purpose processor may further include a chip having other special processing functions of the apparatus 60.

The memory 602 may include a volatile memory, for example, a random access memory (RAM). The memory 602 may also include a non-volatile memory, for example, a read-only memory (ROM), a flash memory, a hard disk drive (HDD), or a solid-state drive (SSD). The memory 602 may further include a combination of the foregoing types of memories.

The system bus 603 may include a data bus, a power bus, a control bus, a signal status bus, and the like. In this embodiment, for clear description, various buses are all schematically shown as the system bus 603 in FIG. 6.

The communications interface 604 may be a transceiver on the apparatus 60. The transceiver may be a radio transceiver. For example, the radio transceiver may be an antenna of the apparatus 60. The processor 601 receives data from and sends data to another device such as a terminal using the communications interface 604.

During specific implementation, the steps in any of the foregoing method procedures may be implemented by executing the computer executable instruction stored in a software form in the memory 602 by the processor 601 that is in a hardware form. To avoid repetition, details are not described herein again.

Because the apparatus 60 provided in this embodiment of the present disclosure may be configured to perform the foregoing method procedures, for a technical effect that can be achieved by the apparatus 60, refer to the foregoing method embodiment, and details are not described herein again.

It should be noted that, the apparatus 50 and/or the apparatus 60 may be a server, or may be a function module in a server. If the apparatus 50 and/or the apparatus 60 are/is a function module in a server, an embodiment of the present disclosure further provides a server. The server includes either of the apparatus 50 or the apparatus 60 described above.

Figure 7:
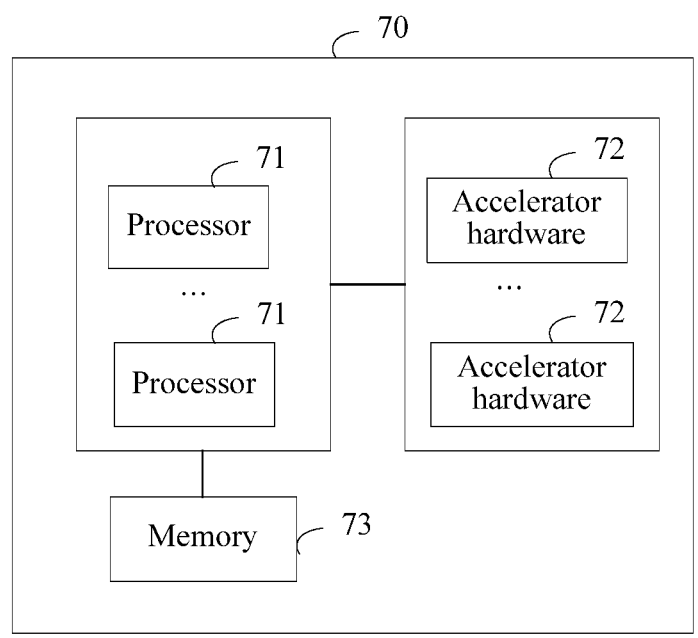
FIG. 7 is a schematic structural diagram of a communications device according to an embodiment of the present disclosure.

As shown in FIG. 7, based on the foregoing embodiments, another embodiment of the present disclosure further provides a communications device, including one or more processors 71, one or more pieces of accelerator hardware 72, and a memory 73.

The processor 71 is configured to process a basic service (not including a service that needs to be processed by an accelerator) and manage the accelerator hardware 72 (for example, load a service logic function for the accelerator hardware). The accelerator hardware 72 may be used as a "bare accelerator" or a "service accelerator" described in the foregoing embodiments. The memory 73 is configured to store code needed by the processor to execute a program and various data generated by the processor during operation.

For a specific process in which the processor 71 manages the accelerator hardware, refer to the specific methods in the foregoing embodiments. For example, refer to steps 301 to 303 in the foregoing embodiment, and details are not described herein again.

It may be clearly understood by persons skilled in the art that, for the purpose of convenient and brief description, in the apparatus described above, division of the foregoing function modules is used as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The descriptions are only specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for configuring an accelerator, applied to a server comprising a bare accelerator, a slave CPU, and a master CPU, wherein the bare accelerator is an accelerator that is generated after a basic logic function is loaded for accelerator hardware, wherein the basic logic function comprises a communications interface function and a loading function, and wherein the method comprises:
   determining, by the server, a target service type and a target bare accelerator;
   determining, by the master CPU, a service logic function corresponding to the target service type;
   loading, by the slave CPU, the service logic function corresponding to the target service type for the target bare accelerator to generate a target service accelerator, wherein the target service accelerator is capable of providing an acceleration service for a service of the target service type;
   allocating, by the slave CPU, an identifier to the target service accelerator;
   reporting the identifier of the target service accelerator to the master CPU; and
   unloading, by the server, the service logic function corresponding to the target service type loaded in the target service accelerator to generate the bare accelerator.

2. The method of claim 1, wherein determining the target service type and the target bare accelerator comprises:
   receiving, by the server, the target service type from a user equipment; and
   selecting, by the server, the bare accelerator as the target bare accelerator when the server does not comprise the accelerator for providing the acceleration service for the service of the target service type.

3. The method of claim 1, further comprising updating, by the server, at least one of a set constituted by identifiers of bare accelerators and a set constituted by identifiers of service accelerators.

4. The method of claim 1, further comprising sending, by the server, at least one of a set constituted by identifiers of bare accelerators and a set constituted by identifiers of service accelerators to a user equipment.

5. The method of claim 1, further comprising displaying, by the server, at least one of a set constituted by identifiers of bare accelerators and a set constituted by identifiers of service accelerators.

6. The method of claim 1, further comprising
   sending, by the slave CPU, a first indication message and a second indication message to the master CPU.

7. The method of claim 6, wherein the first indication message comprises the identifier of the target service accelerator, and the first indication message is used to instruct the master CPU to add the identifier of the target service accelerator into a set constituted by identifiers of service accelerators.

8. The method of claim 6, wherein the second indication message comprises the identifier of the target bare accelerator, and the second indication message is used to instruct the master CPU to delete the identifier of the target bare accelerator from a set constituted by identifiers of bare accelerators.

9. An apparatus for configuring an accelerator, applied to a server comprising a bare accelerator, a slave CPU, and a master CPU, wherein the bare accelerator is an accelerator that is generated after a basic logic function is loaded for accelerator hardware, wherein the basic logic function comprises a communications interface function and a loading function, and wherein the apparatus comprises:
   a memory comprising instructions; and
   a processor coupled to the memory, the instructions causing the processor to be configured to:
      determine a target service type and a target bare accelerator;
      determine a service logic function corresponding to the target service type;
      load the service logic function corresponding to the target service type for the target bare accelerator to generate a target service accelerator, wherein the target service accelerator is capable of providing an acceleration service for a service of the target service type;
      allocate an identifier to the target service accelerator;
      report the identifier of the target service accelerator to the master CPU; and
      unload the service logic function corresponding to the target service type loaded in the target service accelerator to generate the bare accelerator.

10. The apparatus of claim 9, wherein the instructions further cause the processor to be configured to:
    receive the target service type from a user equipment; and
    select the bare accelerator as the target bare accelerator when the server does not comprise the accelerator for providing the acceleration service for the service of the target service type.

11. The apparatus of claim 9, wherein the instructions further cause the processor to be configured to update at least one of a set constituted by identifiers of bare accelerators and a set constituted by identifiers of service accelerators.

12. The apparatus of claim 9, wherein the instructions further cause the processor to be configured to send at least one of a set constituted by identifiers of bare accelerators and a set constituted by identifiers of service accelerators to a user equipment.

13. The apparatus of claim 9, wherein the instructions further cause the processor to be configured to display at least one of a set constituted by identifiers of bare accelerators and the set constituted by identifiers of service accelerators.

14. The method of claim 1, wherein determining the target service type and the target bare accelerator comprises receiving, by the server, the target service type and an identifier of the target bare accelerator from a user equipment.

15. The apparatus of claim 9, wherein the instructions further cause the processor to be configured to receive the target service type and an identifier of the target bare accelerator from a user equipment.

16. The apparatus of claim 9, wherein the instructions further cause the processor to be configured to send a first indication message and a second indication message to the master CPU.

17. The apparatus of claim 16, wherein the first indication message comprises the identifier of the target service accelerator, and wherein the first indication message is used to instruct the master CPU to add the identifier of the target service accelerator into a set constituted by identifiers of service accelerators.

18. The apparatus of claim 16, wherein the second indication message comprises the identifier of the target bare accelerator, and the second indication message is used to instruct the master CPU to delete the identifier of the target bare accelerator from a set constituted by identifiers of bare accelerators.

* * * * *